US011209807B2

(12) United States Patent
Subramaniyan et al.

(10) Patent No.: US 11,209,807 B2
(45) Date of Patent: Dec. 28, 2021

(54) ANOMALY DETECTION

(71) Applicant: GE Inspection Technologies, LP, Lewistown, PA (US)

(72) Inventors: Arun Karthi Subramaniyan, Danville, CA (US); Michael Kennedy, Moraga, CA (US); Haiming Zhao, San Ramon, CA (US); Fabio Nonato de Paula, Livermore, CA (US); Imran Younus, Lewistown, PA (US)

(73) Assignee: GE INSPECTION TECHNOLOGIES, LP, Lewistown, PA (US)

( * ) Notice: Subject to any disclaimer, the term of this patent is extended or adjusted under 35 U.S.C. 154(b) by 404 days.

(21) Appl. No.: 16/257,996

(22) Filed: Jan. 25, 2019

(65) Prior Publication Data
US 2019/0235482 A1  Aug. 1, 2019

Related U.S. Application Data

(60) Provisional application No. 62/622,700, filed on Jan. 26, 2018.

(51) Int. Cl.
| | |
|---|---|
| G05B 23/02 | (2006.01) |
| G06N 5/02 | (2006.01) |
| G06N 20/00 | (2019.01) |
| G05B 13/04 | (2006.01) |
| G05B 17/02 | (2006.01) |

(52) U.S. Cl.
CPC ....... *G05B 23/0221* (2013.01); *G05B 13/048* (2013.01); *G05B 23/0224* (2013.01); *G05B 23/0243* (2013.01); *G05B 23/0272* (2013.01); *G06N 5/025* (2013.01); *G06N 20/00* (2019.01); *G05B 17/02* (2013.01)

(58) Field of Classification Search
CPC ............ G05B 23/0221; G05B 23/0224; G05B 23/0272; G05B 13/048; G06N 20/00; G06N 5/025
See application file for complete search history.

(56) References Cited

U.S. PATENT DOCUMENTS

| | | | |
|---|---|---|---|
| 10,526,771 B1 * | 1/2020 | Devereaux | ............... E03B 7/071 |
| 2013/0073260 A1 * | 3/2013 | Maeda | ............... G05B 23/0224 |
| | | | 702/183 |
| 2016/0343272 A1 * | 11/2016 | Roche | ...................... G09B 5/04 |

* cited by examiner

*Primary Examiner* — Bryan Bui
(74) *Attorney, Agent, or Firm* — Mintz Levin Cohn Ferris Glovsky and Popeo, PC; Lisa Adams

(57) ABSTRACT

A method includes receiving a first time-dependent data characterizing measurement by a first sensor operatively coupled to an oil and gas industrial machine; determining a first anomaly score associated with a first portion of the first time-dependent data over a time period, the determination is based on a first value of an operating characteristic over the time period and a second value of the operating characteristic over the time period, wherein the first value of the operating characteristic is calculated from the first time-dependent data and the second value of the operating characteristic is detected at the oil and gas industrial machine; and rendering, in a graphical user interface display space, a visual representation indicative of the first anomaly score. Related apparatus, systems, articles, and techniques are also described.

16 Claims, 6 Drawing Sheets

ANOMALY DETECTION

RELATED APPLICATION

This application claims priority under 35 U.S.C. § 119(e) to U.S. Provisional Patent Application No. 62/622,700 filed on Jan. 26, 2018, the entire contents of which are hereby expressly incorporated by reference herein.

BACKGROUND

Industrial equipment can be complex and can be prone to different types of complex modes of failure. The equipment can include a multitude of sensors that can be used to monitor operation of the equipment. One method of utilizing sensor data includes developing rule-based detection schemes that can be used to monitor performance of the equipment. Based on the rules implemented within the detection schemes, the sensors, or a controller monitoring the sensors, can determine if the equipment is operating within acceptable parameters.

However, developing rule-based detection schemes for every possible anomaly can be cumbersome, difficult, and error prone. If a certain possible failure mode is not anticipated, then the rule-based detection scheme can be unsuccessful in detecting signs of the failure. Additionally, in some cases, industrial equipment can be located in remote areas where access to the equipment may be difficult or undesirable. Therefore, implementing, or updating, rule-based detection schemes can be extremely difficult due to the limited access to the equipment.

SUMMARY

Various aspects of the disclosed subject matter may provide one or more of the following capabilities.

In an aspect, a method includes receiving a first time-dependent data characterizing measurement by a first sensor operatively coupled to an oil and gas industrial machine; determining a first anomaly score associated with a first portion of the first time-dependent data over a time period, the determination is based on a first value of an operating characteristic over the time period and a second value of the operating characteristic over the time period, wherein the first value of the operating characteristic is calculated from the first time-dependent data and the second value of the operating characteristic is detected at the oil and gas industrial machine; and rendering, in a graphical user interface display space, a visual representation indicative of the first anomaly score.

One or more of the following features can be included in any feasible combination. Determining the first anomaly score can include calculating a difference between the first value of the operating characteristic and the second value of the operating characteristic and comparing the difference with a predetermined threshold value. The method can include determining a first predictive model of the first sensor based on historical data associated with the first sensor. Determining the first predictive model can include determining one or more coefficients of a characteristic equation associated with the oil and gas industrial machines based on the historical data. The characteristic equation can be configured to receive the first time-dependent data as an input and generate the first anomaly score. The first predictive model can calculate the first value of the operating characteristic from the time-dependent data characterizing measurement by the first sensor. The graphical user interface display space can include a first interactive object and a second interactive object. The first interactive object can be configured to receive a first user input, and the second interactive object can be configured to receive a second user input. The determining of the first predictive model can be performed based on the first user input. The receiving of time-dependent data characterizing measurement can be by a first sensor. The determining of the first anomaly score and the rendering of the visual representation can be performed based on the second user input. The method can include receiving a second time-dependent data characterizing measurement by a second sensor operatively coupled to the oil and gas industrial machine; determining a second anomaly score associated with a first portion of the second time-dependent data over the time period, the determination is based on a third value of the operating characteristic over the time period and a fourth value of the operating characteristic over the time period, the third value of the operating characteristic is calculated from the received time-dependent data characterizing measurement by the second sensor and the second value of the operating characteristic is detected at the oil and gas industrial machine; and determining a modified anomaly score based on the first anomaly score and the second anomaly score.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

These and other capabilities of the disclosed subject matter will be more fully understood after a review of the following figures, detailed description, and claims.

DETAILED DESCRIPTION

Figure 1:
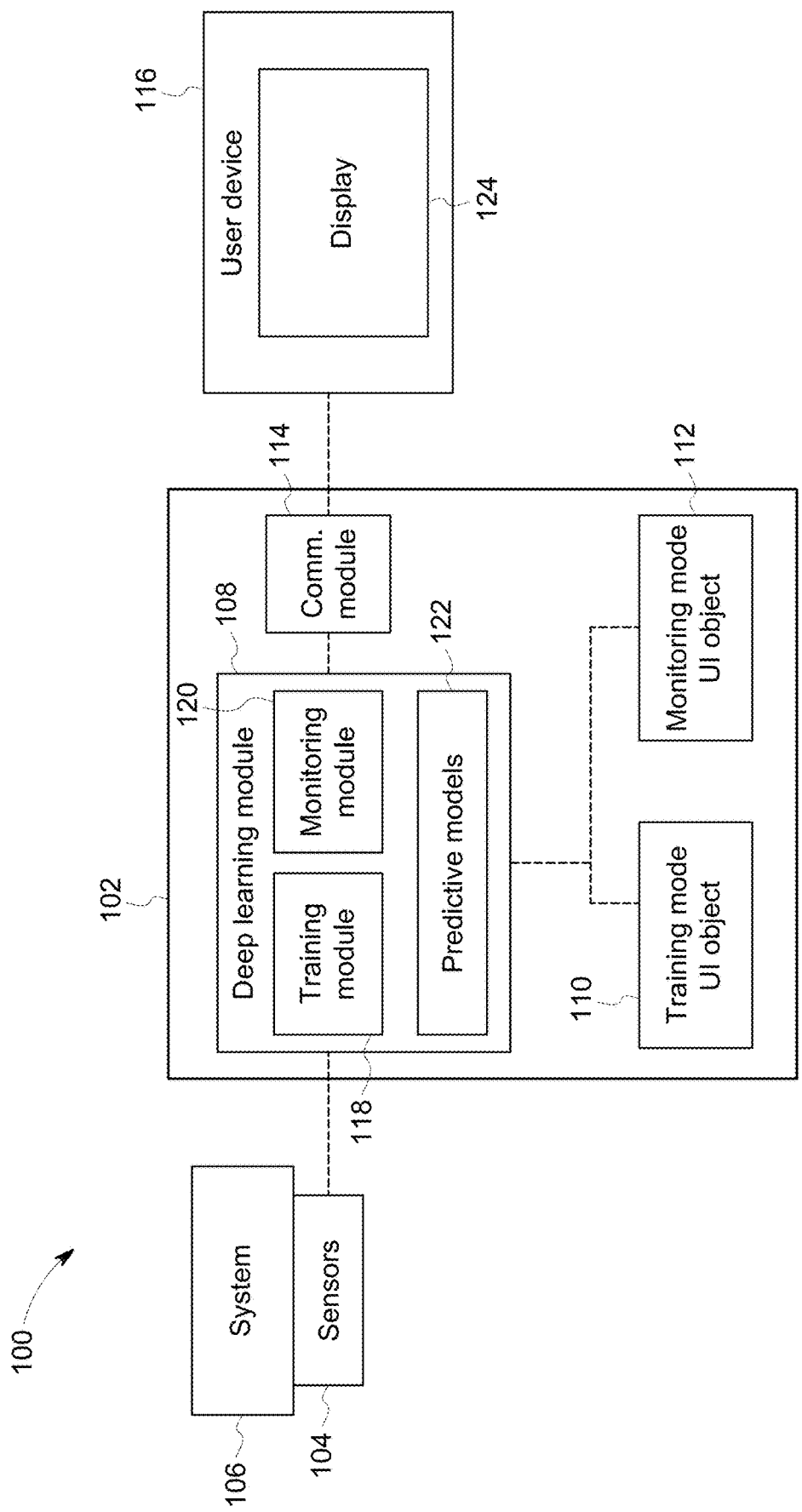
FIG. 1 is a system block diagram of one exemplary embodiment of an industrial system that includes an anomaly detection (AD) system.

Systems, methods, and devices are provided that facilitate detecting anomalies in performance of industrial systems. In one embodiment, an anomaly detection device is provided that includes a training mode and a monitoring mode. While operating in the training mode, the anomaly monitoring device can apply sensor data (e.g., historical sensor data) as inputs within an unsupervised machine learning algorithm to generate a model that can be used to predict operation of the industrial system. The sensor data can be from sensors measuring operating values of the industrial system. While operating in the monitoring mode, the anomaly monitoring device can compare real-time sensor data (e.g., indicative of an operational characteristic of the industrial system) with predicted data generated using the model. If the sensor data deviates from the predicted data by a predetermined amount, the anomaly monitoring device can provide a user with an alert to inform the user that an anomaly has been detected and that the system may not be operating properly. By generating the models using unsupervised machine learning, anomaly detection can be implemented without requiring prior knowledge about the sensors, the equipment being monitored, or characteristics of anomalous performance. Thus the anomaly monitoring device provides a simple and flexible solution to monitor performance of systems and to provide users with alerts identifying anomalous performance.

Industrial equipment can be complex and can be prone to many types of complex failure modes. The equipment can include a multitude of sensors that can be used to monitor operation of the equipment. However, the sensors simply output data and do not necessarily provide useful information to a user. One method of utilizing the data includes developing rules that can be used analyze sensor data to detect anomalous equipment operation. However, developing rules for every possible anomaly that can occur during operation can be cumbersome, difficult, and error prone. Systems, methods and devices are provided that facilitate automated anomaly detection using unsupervised machine learning algorithms. In one embodiment, an anomaly monitoring device is provided that can apply sensor data as inputs within an unsupervised machine learning algorithm to generate a predictive model of operation of an industrial system, or part of an industrial system. The anomaly monitoring device can also compare real-time sensor data with predicted data generated using the predictive model. If the sensor data deviates from the predicted data by a predetermined amount, the anomaly monitoring device can provide a user with an alert to inform the user that an anomaly has been detected and that the system may not be operating properly. Thus the anomaly monitoring device provides a simple and flexible solution to monitor performance of systems and to provide users with alerts identifying anomalous performance. By generating the predictive models using unsupervised machine learning, anomaly detection can be implemented without requiring prior knowledge about the sensors, the equipment being monitored, or characteristics of anomalous performance. Anomaly detection is thus enabled in situations in which it would otherwise be cost-prohibitive, difficult, and/or infeasible to develop rules that can be used analyze sensor data to detect anomalies.

FIG. 1 shows an exemplary system block diagram of an industrial system 100 that includes an anomaly detection (AD) system 102. The AD system 102 can be configured to identify anomalous performance of systems and/or components of systems. The AD system 102 can also be configured to provide a user with an alert characterizing the anomalous performance. As an example, anomalous performance can occur when there is a "rub," which characterizes a condition when a foreign object brushes against a rotor shaft. As another example, anomalous performance can occur when there is a transient source of external vibration. In the illustrated embodiment, the AD system 102 is operably coupled to one or more sensors 104. The sensors 104 can be operably coupled a system 106, and the sensors 104 can measure operating values of the system 106. For example, the sensors 104 can measure vibrations, positions, rotation speeds, temperatures, pressures, flow rates, fluid compositions, etc.

The AD system 102 can include a deep learning module 108, user interface objects 110, 112, and a communication module 114. The deep learning module 108 can include, and/or be implemented on, a data processor, including accelerated computing hardware such as, e.g., a graphics processing unit (GPU). In some embodiments, the GPU can be an NVIDIA® Jetson GPU. NVIDIA® Jetson GPUs can be low power, consuming approximately 90 watts. The GPU can include approximately 256 GPU cores and can be capable of 1.5 Teraflops of parallel computing performance. As another example, an NVIDIA® DGX station can be used if more computing power is desired. By taking advantage of GPU based parallel computing, analysis times can be reduce from days to minutes. The deep learning module 108 can be configured to process data from the sensors 104, generate predictive models 122 to predict performance of the system 106, and use the predictive models 122 to identify anomalous performance of the system 106.

Embodiments of the predictive models 122 can be generated in a variety of ways. In one aspect, the predictive models 122 can be generated and/or trained using a GPU (e.g., an NVIDIA® Jetson, or the like) on an edge platform. An edge platform can be a platform on an edge of a network. In another aspect, the predictive models 122 can be generated and/or trained using a GPU containing server, workstation, or cloud platform such as the DGX station. In each case, the predictive models 122 can be deployed to the deep learning module 108 on the AD system 102. As such, a remote deep learning module can be an extension of the deep learning module 108 of the AD system 102. Other embodiments can use one or more GPU processing units in a portable or stationary platform. The user interface objects 110, 112 can be electronically coupled to the deep learning module 108 and can be configured to activate training and monitoring operating modes of the deep learning module 108, respectively. The training and monitoring operating modes of the deep learning module 108 are described in more detail below.

The communication module 114 can be configured to facilitate communication between the deep learning module 108 and a user device 116. For example, the communications module can be, or can include, a transceiver. The communication module 114 can enable wired communication via e.g., Ethernet, and can include, e.g., a transceiver for communicating via Bluetooth protocol, cellular protocol, WI-FI protocol, near field communication (NFC), and/or a radio frequency identification (RFID) protocol. Wired and/or wireless communication via the communication module 114 can be according to any of a variety of communication protocols, e.g., TCP/IP, etc., as will be appreciated by a person skilled in the art. Wireless cellular connectivity can be configured to provide wireless mobile communication, such as cellular connectivity. The wireless cellular connectivity can be 4G connectivity but other types of mobile communication standards may be used instead or in addition. Any of a variety of types of wireless cellular connectivity hardware can be used for the wireless cellular connectivity, as will be appreciated by a person skilled in the art. Wireless AC connectivity can be configured to provide wireless communication in accordance with the IEEE 802.11ac wireless networking standard. Connectivity according to another wireless networking standard is possible and may be included alternatively or in addition. The wireless AC connectivity may facilitate wireless mesh network communication, as will be appreciated by a person skilled in the art. Any of a variety of types of wireless AC connectivity hardware can be used for the wireless AC connectivity, as will be appreciated by a person skilled in the art.

In the illustrated example, the deep learning module 108 includes a training module 118 and a monitoring module 120. The training module 118 can be configured to generate predictive models 122, e.g., by applying sensor data from the sensors 104 as inputs within unsupervised deep learning algorithms. In some embodiments, the training module 118 can be activated when the deep learning module 108 is in the training operating mode. The monitoring module 120 can be configured to use the predictive models 122 to generate data characterizing predicted performance of the system 106. The monitoring module 120 can also be configured detect anomalies in performance of the system 106 by comparing data characterizing measured values (e.g., measurements from the sensors 104) to data characterizing predicted performance (e.g., outputs from the predictive models 122). In some embodiments, the monitoring module 120 can be activated when the deep learning module 108 is in the monitoring operating mode.

In operation the AD system 102 can be coupled to the sensors 104. The deep learning module 108 can be trained to detect anomalous performance of the system 106 using real-time sensor data from the sensors 104. For example, a user can press the training mode user interface object 110 which can deliver a signal to the deep learning module 108 to activate the training operating mode of the deep learning module 108. While the training operating mode is active, the sensors 104 can provide sensor data to the training module 118 characterizing measured operating values of the system 106 while the system 106 is operating in a state of trusted operation. The state of trusted operation can describe a condition in which the system 106 is operating with acceptable, or expected performance. For example, the system can be operating with an acceptable rate of occurrence of anomalies. In some cases, the system operation can be free from anomalies. The sensor data can be real-time data from the sensors 104 while the system 106 is in operation.

The training module 118 can use unsupervised deep learning to generate the predictive models 122. For example, the training module 118 can apply the sensor data as inputs within one or more unsupervised deep learning algorithms to generate the predictive models 122. In some cases, the training can be performed in a relatively short period of time (e.g., under six minutes). In unsupervised learning, the training module 118 can be given the sensor data and the training module 118 can automatically find patterns and relationships that characterize operation of the system 106. In this case, since the sensor data characterizes trusted operation of the system 106, the patterns and relationships identified by the training module 118 characterize trusted operation of the system 106. In some cases, the patterns can include certain shapes of data from the sensors 104. For example, the sensor data can have a characteristic shape such as, e.g., a sinusoidal shape. As another example, the training module 118 can identify relationships between sensor data from multiple sensors 104. Examples of unsupervised learning can include, but are not limited to, clustering and outlier detection. In a clustering approach, common characteristics can be clustered together. By identifying the proper characteristics for clustering, meaningful clusters can be assembled. In an outlier detection approach, certain characteristic measurements that lie outside the expected can be identified.

After the predictive models 122 have been generated, the deep learning module 108 can monitor sensor data to identify anomalous performance of the system 106. For example, the user can press the monitoring mode user interface object 112 which can deliver a signal to the deep learning module 108 to activate the monitoring operating mode of the deep learning module 108. While the monitoring operating mode is active, the sensors 104 can provide sensor data to the monitoring module 120 characterizing measured operating values of the system 106. The sensor data can be real-time data from the sensors 104 while the system 106 is in operation.

The monitoring module 120 can apply the predictive models 122 and the sensor data within an unsupervised deep learning algorithm to monitor for anomalous performance of the system 106. For example, the monitoring module 120 can compare the sensor data to predicted data from the predictive models 122. If a difference between the sensor data and the predicted data exceeds a certain threshold, the data can be identified as anomalous, and/or the data can be determined to represent anomalous system performance. In some cases, differences between sensor data and predicted data that are within a predetermined number of standard deviations (e.g., three standard deviations) from a mean value can be determined to be normal. Differences between sensor data and predicted data that are not within the threshold can be determined to be anomalous. As another example, the monitoring module 120 can compare patterns and relationships corresponding to predicted data to the patterns and relationships corresponding to sensor data. If the differences between the patterns and relationships corresponding to predicted data and the patterns and relationships corresponding to sensor data exceed a certain threshold, (e.g., three standard deviations from a mean value) the sensor data can be identified as anomalous, and/or the data can be determined to represent anomalous system performance.

If anomalous data is identified, the deep learning module 108 can provide an alert to a user device 116. For example, the deep learning module 108 can generate and format data that characterizes and/or identifies anomalous performance of the system 106, render a graphical representation of the data, and deliver data characterizing the rendered graphical representation to a display 124 of the user device 116, e.g., via the communication module 114, to provide an alert to a user such the user can be notified of the anomalous performance. As another example, the deep learning module 108 can generate and format data that characterizes and/or identifies anomalous performance of the system 106, generate instructions for rendering a graphical representation of the data, and deliver data characterizing the anomalous performance and the instructions to the user device 116. A data processor of the user device 116 can receive the data, including the instructions, render a graphical representation of the data using the instructions, and deliver data characterizing the rendered graphical representation to the display 124 to provide an alert to the user. The data that characterizes and/or identifies anomalous performance can include sensor data, predicted data, information identifying sensors 104 that provided anomalous data, and data characterizing patterns and/or relationships used to identify anomalous data. In some embodiments, the display 124 can be an interactive display, such as a touchscreen display.

In some cases, operation of the system 106 can change over the lifetime of the system 106. For example, a user can change a mode of operation of the system 106. As another example, normal wear of components of the system 106 can cause the system 106 to operate differently. In such cases, if operation of the system 106 has changed sufficiently, the AD system 102 can erroneously determine that sensor data is anomalous. To prevent erroneous alarms, a user can retrain the system based on a current state of trusted operation of the system 106. As an example, a user can press the training mode user interface object 110 which can activate the training operating mode of the deep learning module 108. While in the training operating mode, the sensors 104 can provide sensor data to the training module 118 characterizing measured operating values of the system 106 while the system 106 is operating in a current state of trusted operation. The training module 118 can use unsupervised deep learning to generate updated predictive models 122. For example, the training module 118 apply the sensor data as inputs within one or more unsupervised deep learning algorithms to generate the updated predictive models 122. The training module 118 can also find patterns and relationships that characterize an updated standard of acceptable operation of the system 106. The updated standard of acceptable operation can include updated thresholds that can be used to determine if sensor data is anomalous.

Alternatively, in some cases, the deep learning module 108 can retrain itself a based on current and/or recent operation of the system 106. For example, if operation of the system 106 changes over the lifetime of the system 106, or if the sensor data includes some noise, the AD system 102 may initially determine that sensor data is anomalous. However, with repeated operation, the AD system 102 can retrain itself using the sensor data to update the thresholds for determining anomalous performance.

Although the AD system 102 and the user device 116 are illustrated as independent components in FIG. 1, the AD system 102 and the user device 116, and/or components of the user device 116, can be combined. For example, in some embodiments, the display 124 can be included as part of the AD system 102 such that a user can be presented with alerts on the AD system 102.

Figure 2:
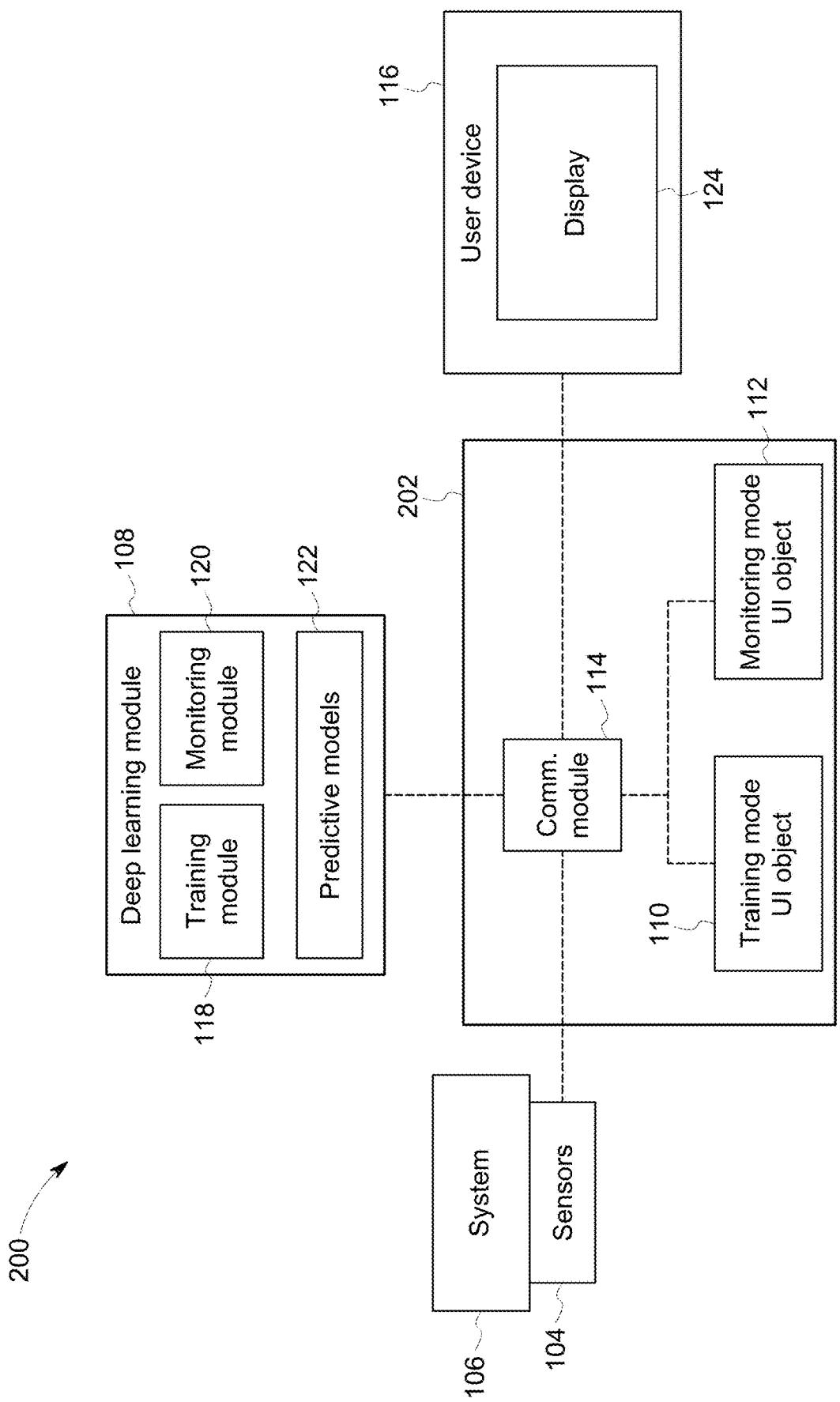
FIG. 2 is a system block diagram illustrating another exemplary embodiment of an industrial system that includes an AD system.

In some embodiments, the deep learning module 108 of the AD system 102 can be at a remote location. FIG. 2 shows an exemplary system block diagram of an industrial system 200 that includes an AD system 202. The AD system 202 can be similar to the AD system 102, but a deep learning module 108 can be at a remote location. The AD system 202 can include a communication module 114, and user interface objects 110, 112, which can function as described above. The communication module 114 can be configured to facilitate communication between the sensors 104, the user interface objects 110, 112, a user device 116, and the deep learning module 108. The deep learning module 108 can include a training module 118, a monitoring module 120, and predictive models 122, which can function as described above. In the illustrated embodiment, sensors 104 can provide sensor data to the deep learning module 108 via the communication module 114. The user interface objects 110, 112 can provide signals to the deep learning module 108 via the communication module 114. The deep learning module 108 can provide data characterizing alerts to the user device 116 via the communication module 114.

In some embodiments, a deep learning module on a remote server can function as an extension of a deep learning module of an AD system. For example, generating or training predictive models can be performed on the remote server. Retraining the predictive models and/or monitor performance of an industrial system can occur on the AD system, which can be local to the industrial system.

Figure 3:
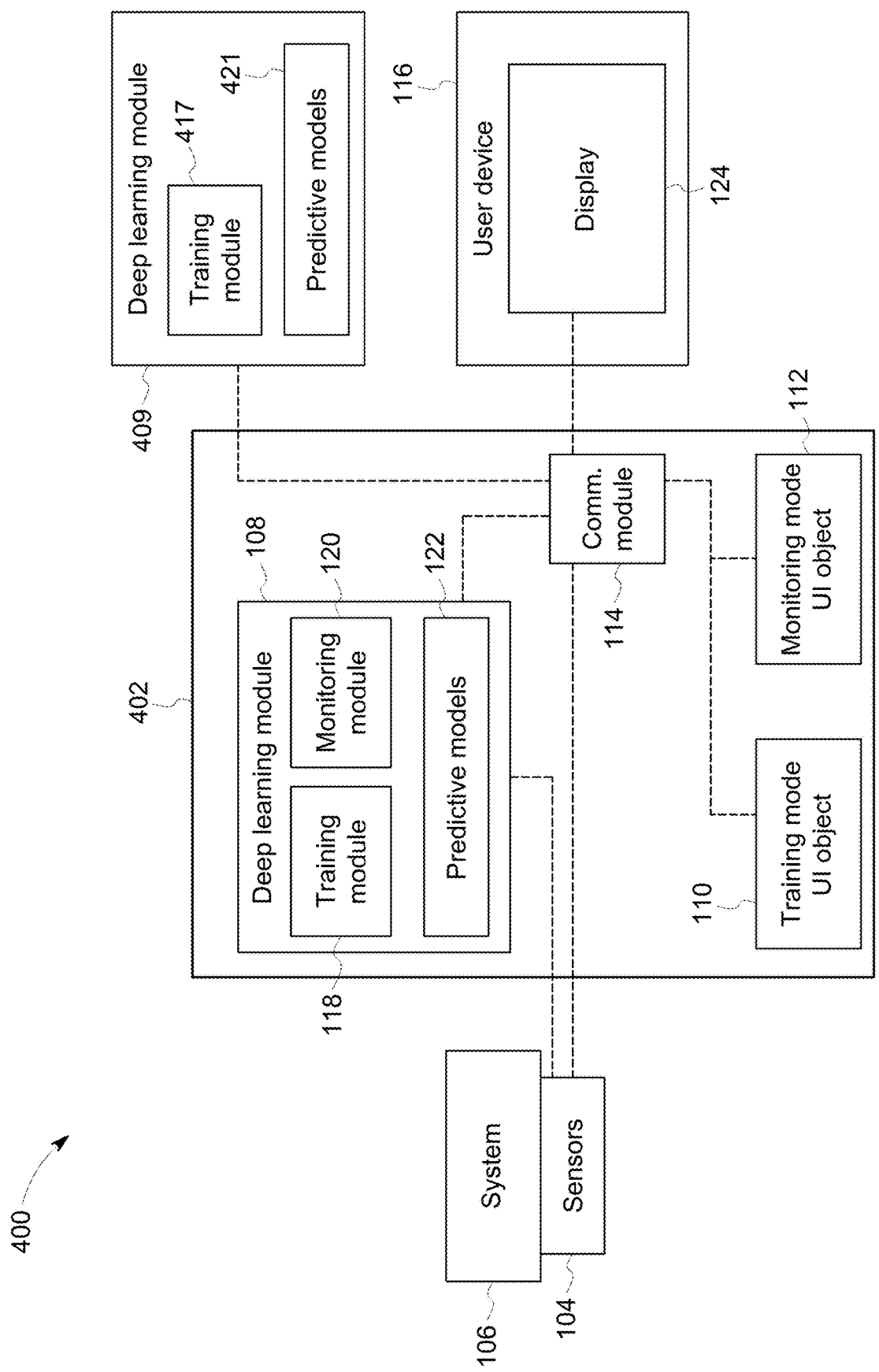
FIG. 3 is a system block diagram illustrating another exemplary embodiment of an industrial system that includes an AD system.

FIG. 3 shows an exemplary system block diagram of an industrial system 400 that includes an AD system 402 and a deep learning module 409 that can be implemented on a remote server. The AD system 402 can include a deep learning module 108, a communication module 114, and user interface objects 110, 112, which can function as described above. The communication module 114 can be configured to facilitate communication between the sensors 104, the user interface objects 110, 112, the user device 116, and the deep learning modules 108, 409. The deep learning module 108 can include a training module 118, a monitoring module 120, and predictive models 122, which can function as described above. In the illustrated embodiment, sensors 104 can provide sensor data to the deep learning module 409 via the communication module 114. The user interface objects 110, 112 can provide signals to the deep learning module 108 via the communication module 114. The deep learning module 108 can provide data characterizing alerts to the user device 116 via the communication module 114.

The deep learning module 409 can be include a training module 417 which can be configured to generate predictive models 421. For example, a user can press the training mode user interface object 110 which can deliver a signal to the deep learning module 409 to activate a training operating mode of the deep learning module 409. While the training operating mode is active, the sensors 104 can provide sensor data to the training module 417 (e.g., via the communication module 114) that characterizes measured operating values of the system 106 while the system 106 is operating in a state of trusted operation. The sensor data can be real-time data from the sensors 104 while the system 106 is in operation. The training module 417 can use unsupervised deep learning to generate the predictive models 421. For example, the training module 118 can apply the sensor data as inputs within one or more unsupervised deep learning algorithms to generate the predictive models 421. The deep learning module 409 can provide data characterizing the predictive models 421 the deep learning module 108 via the communication module 114 to generate the predictive models 122.

After the predictive models 122 have been generated, the deep learning module 108 can monitor sensor data to identify anomalous performance of the system 106 and provide alerts to the user device 116, as described above.

In some cases, a user can retrain the predictive models 122 based on a current state of trusted operation of the system 106. As an example, a user can press the training mode user interface object 110 which can activate the training operating mode of the deep learning module 108. While in the training operating mode, the sensors 104 can provide sensor data to the training module 118 characterizing measured operating values of the system 106 while the system 106 is operating in a current state of trusted operation. The training module 118 can use unsupervised deep learning to generate updated predictive models 122. The training module 118 can also find patterns and relationships that characterize an updated standard of acceptable operation of the system 106. The updated standard of acceptable operation can include updated thresholds that can be used to determine if sensor data is anomalous.

Implementing the deep learning module 409 on the remote server can allow users to take advantage of powerful computing systems for initial generation and training of the predictive models 421. The predictive models 421 can then be delivered to the deep learning module 108 within the AD system 402 to generate the predictive models 122. The predictive models 122 can be updated and implemented on the deep learning module 108, which can be local to the system 106, and may have less computing power than that which can be available to the deep learning module 409 on the remote server. As such, the external deep learning module 409 can be an extension of the deep learning module 108 of the AD system 402.

Figure 4:
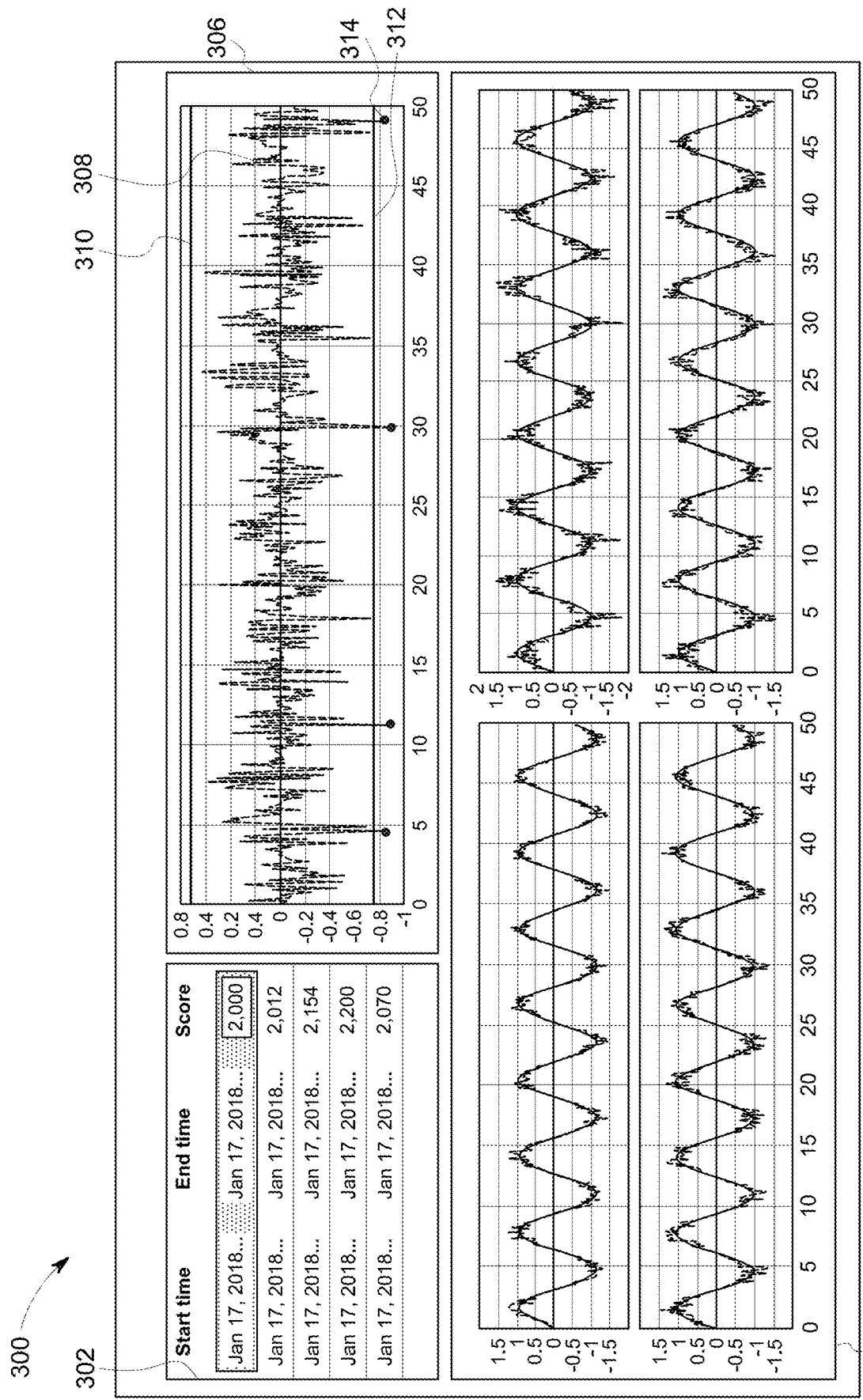
FIG. 4 is a view of a graphical user interface (GUI) of an AD system that can provide a user with notifications regarding anomalous system performance.

FIG. 4 shows a view 300 of an exemplary graphical user interface (GUI) of an AD system (e.g., 102, 202, 402) that can be shown on a display (e.g., display 124). The GUI includes a data log 302 and data panels 304, 306. The data log 302 shows start times, end times, and scores of monitoring results. The scores can characterize anomalous performance of a system that was monitored, and/or is being monitored. The data panel 304 can show sensor data from sensors (e.g., sensors 104) and predicted data generated by predictive models (e.g., predictive models 122), corresponding to monitoring results selected in the data log 302. In the illustrated example, the data panel 304 shows four plots corresponding to four different sensors. However, as described above, the AD system can utilize any number of sensors. Therefore, the data panel 304 can include any number of plots. As an example, the data panel 304 can allow a user to scroll through a large number of plots that may not be practical to display simultaneously within the data panel 304.

The data panel 306 can show data characterizing patterns and/or relationships used to identify anomalous performance of a system. In the illustrated example, the data panel 306 shows a plot illustrating data 308 that characterizes a difference between sensor data and predicted data for a given sensor. The plot can include graphical elements 310, 312 that can identify thresholds for acceptable performance. Data that extends beyond the thresholds can be determined to be anomalous, and can be identified by graphical elements 314.

Existing rule-based detection schemes for identifying anomalous performance can require that the rule-based detection schemes are developed for each possible anomaly that might be detected. Developing rule-based detection schemes for every possible anomaly can be cumbersome, difficult, and error prone. If a certain possible failure mode is not anticipated, then the rule-based detection scheme can be unsuccessful in detecting signs of the failure. By generating the predictive models using unsupervised deep learning, anomaly detection can be implemented without requiring prior knowledge about the sensors, the equipment being monitored, or characteristics of anomalous performance.

Exemplary technical effects include the ability to automatically detect anomalous system performance without manual specification of thresholds or characteristics that define anomalous performance. The systems, methods, and devices described herein can include the ability to quickly retrain predictive models, which can be used to identify anomalous performance, using sensor data characterizing operating values of a system. Retraining the predictive models can update thresholds used to identify anomalous performance, thereby increasing the effectiveness of anomaly detection. The ability to quickly retain predictive models using sensor data can facilitate implementation of anomaly detection under conditions in which it would otherwise be cost-prohibitive, difficult, and/or infeasible to develop rule-based detection schemes for anomaly detection.

Figure 5:
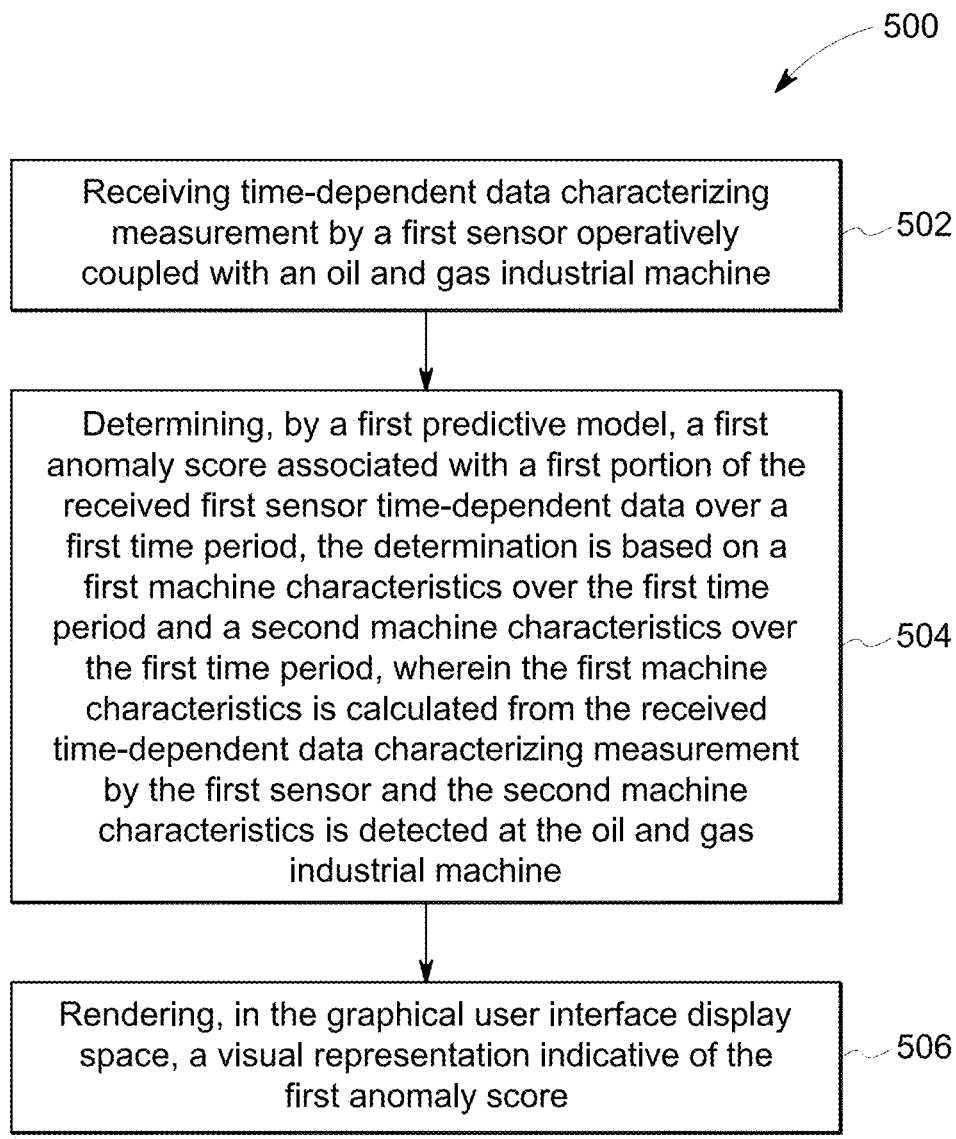
FIG. 5 is a flow chart of an exemplary method of detecting anomaly associated with an industrial machine.

FIG. 5 is a flow chart of an exemplary method of detecting anomaly in an industrial machine. At 502, a first time-dependent data characterizing measurement by a first sensor operatively coupled with an oil and gas industrial machine can be received (received in real-time). For example, deep learning module 108 can receive time-dependent sensor data detected by sensor 104. The time-dependent sensor data can include, for example, variations of properties of the system 106 (e.g., frequency, torque, power consumption, etc.) as a function of time.

At 504, a first anomaly score associated with a first portion of the first time-dependent data over a time period can be determined (e.g., by the deep learning module 108). For example, the deep learning module 108 can identify a portion of the first time-dependent data from the first sensor (e.g., detected over a predetermined time period). The predictive model 122 can calculate a first value (or a vector of values) of an operational characteristic of the oil and gas industrial machine based on the first portion of the first time-dependent data. The deep learning module 108 can also receive data indicative of measurement of the operational characteristic (e.g., by a sensor operatively coupled to the oil and gas industrial machine). The deep learning module 108 can compare the calculated value and the measured value of the operational characteristic, and determine the first anomaly score based on the comparison. In some implementations, a difference between the calculated value and the measured value of the operational characteristic is calculated. The calculated difference is compared to a table of anomaly scores, and an anomaly score is selected based on the calculated difference from the table. The anomaly score can be indicative of the severity of an anomalous behavior of the oil and gas industrial machine (e.g., higher the anomaly score, more severe an alarm condition associated with the machine).

In some implementations, multiple anomaly scores can be determined. A second time-dependent data characterizing measurement by a second sensor that is operatively coupled to the oil and gas industrial machine is received (e.g. by the deep learning module 108). The deep learning module 108 can identify a portion of the second time-dependent data from the second sensor. A second predictive model (or the first predictive model) can calculate operating characteristic value based on the identified portion of the second time-dependent data. The deep learning module 108 can compare the calculated operational characteristic value with detected operational characteristic value. Based on this comparison, a second anomaly score can be determined (e.g., as described above).

In some implementations, the severity of the anomalous behavior of the oil and gas industrial machine over a predetermined time period can be based on a modified anomaly score of the oil and gas industrial machine. The modified anomaly score can be calculated by averaging the first and the second anomaly scores. In some implementation, the first and the second anomaly scores can be weighted differently in the calculation of the modified anomaly score (e.g., the first anomaly score can be multiplied by a first weight value which is larger than a second weight value multiplied to the second anomaly score). The anomaly score calculation can be repeated (e.g., periodically). If the anomalous score exceeds an alarm threshold, an operator can be notified.

The first predictive model of the first sensor can be determined based on historical data associated with the first sensor, properties of the oil and gas industrial machine, etc. The first predictive model can calculate the operational characteristics from the first time-dependent data characterizing measurement by the first sensor. The first predictive model can be determined by calculating one or more system coefficients of a characteristic equation associated with the oil and gas industrial machines based on the historical data. The characteristic mathematical representation can include a system of equations that can determine the first anomaly score.

Various information associated with the anomaly detection system can be presented on a graphical user interface (GUI) display space. For example, the GUI display space can present sensor data (e.g., time-dependent sensor data) detected by various sensors (e.g., sensor 104) operatively coupled to the oil and gas industrial machine, calculated anomaly scores, contributions (e.g., numerical weight) of the various sensors, etc. In some implementations, the GUI display space can include interactive objects configured to receive one or more user inputs. For example, the first interactive object can receive a first user input that can initiate the generation of a predictive model (e.g., based on historical data). The second interactive object can receive a second user input that can initiate the monitoring of the oil and gas industrial machine (e.g., by receiving sensor data, determining anomaly score, displaying the anomaly score in the GUI display, etc).

Figure 6:
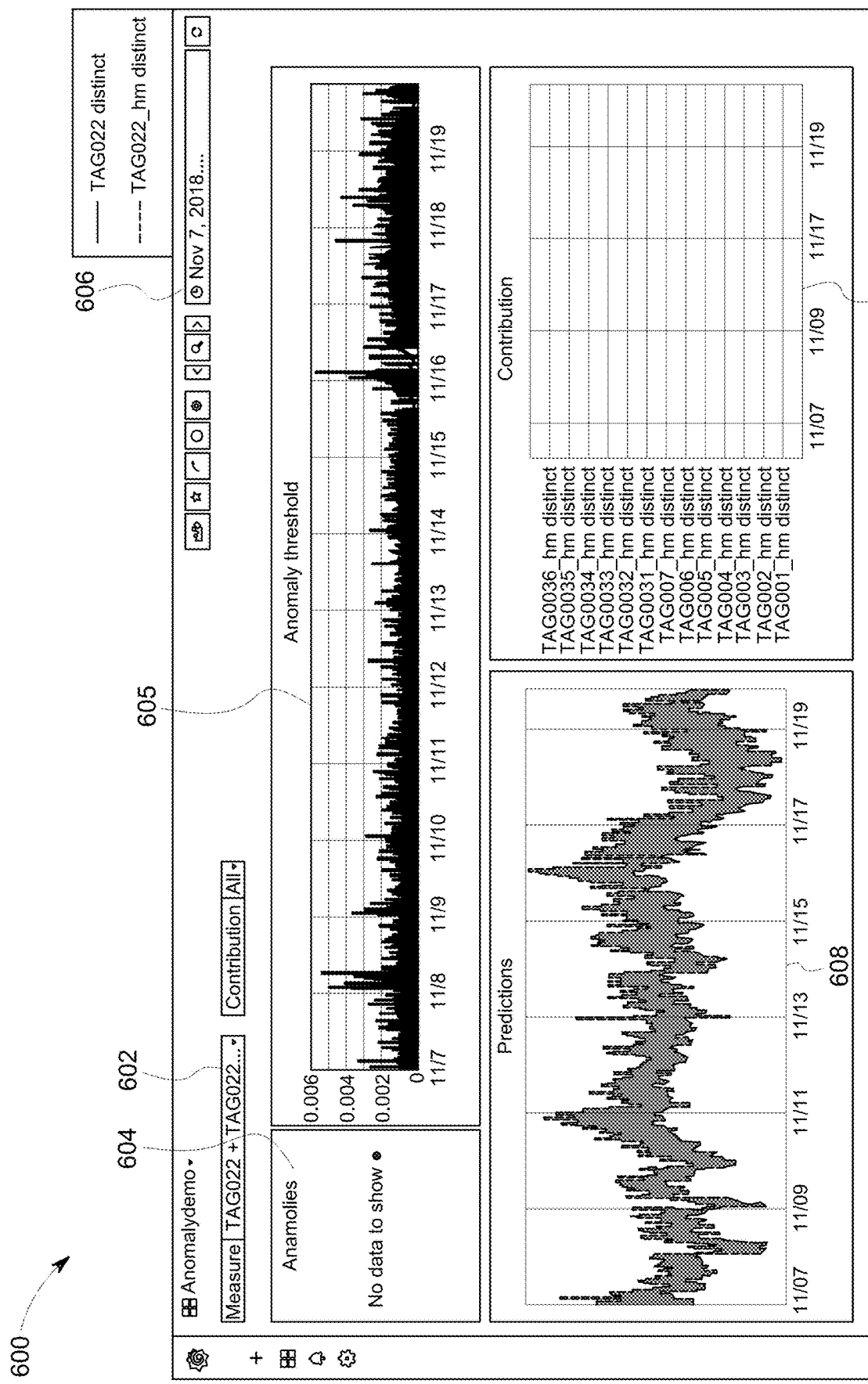
FIG. 6 illustrates an exemplary GUI display space that renders various information associated with an AD system.

FIG. 6 illustrates an exemplary GUI displace space 600 that renders various information associated with an anomaly detection system. The GUI display space 600 can render sensor filter 602 that can allow the user to receive/select information associated with various sensors in the anomaly detection system. The GUI display space 600 can render anomaly listing 604 that can include one or more anomalous events. The anomaly listing can include anomaly scores associated with various anomalous events. The anomaly scores can be color coded based on the severity of the associated anomalous behavior (e.g., alarm associated with the oil and gas manufacturing machine).

The GUI display space 600 can render a plot 605 of the anomaly score. In some implementations, the anomaly score can be generated (e.g., by the deep learning model) with the same time interval as the time interval of sensor data. The plot 605 can also include a visual representation of predetermined threshold anomaly score that can allow for comparison between the calculated anomaly score and the threshold anomaly score. Any score that exceed this threshold score can be highlighted.

The GUI display space 600 can render time interactive control 606 that can allow the user to vary the time duration (e.g., time duration of sensor data) of anomaly detection analysis (e.g., calculation of anomaly scores). The GUI display space 600 can render time series prediction 608 that can allow for comparison between sensor data of an operational characteristic (e.g., detected by sensors operatively coupled to the oil and gas industrial machine) and calculated operational characteristic.

The GUI display can render sensor contribution plot 610 that can present sensor data (e.g., simultaneously) from multiple sensors in the anomaly detection system. The x-axis of the plot 610 represents time, which can be customized via the time interactive control 606. The various rows of the plot 610 represent data from various sensors. The sensor data can be color coded (e.g., based on the sensor) to represent their contribution to anomaly score calculation. For example, lighter colors represent small contributions, and darker colors represent increased contributions to the overall anomaly score.

One skilled in the art will appreciate further features and advantages based on the above-described embodiments. Accordingly, the present application is not to be limited specifically by what has been particularly shown and described. All publications and references cited herein are expressly incorporated herein by reference in their entirety.

Other embodiments are within the scope and spirit of the disclosed systems, methods, and devices. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the embodiments disclosed herein.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon. The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A method comprising:
   receiving a first time-dependent data characterizing measurement by a first sensor operatively coupled to an oil and gas industrial machine;

calculating, from the first time-dependent data, a first value of an operating characteristic of the oil and gas industrial machine over a time period;

receiving a second value of the operating characteristic detected at the oil and gas industrial machine;

determining a first anomaly score associated with a first portion of the first time-dependent data over the time period, the determination is based on the first value of and the second value; and rendering, in a graphical user interface display space, a visual representation indicative of the first anomaly score;

receiving a second time-dependent data characterizing measurement by a second sensor operatively coupled to the oil and gas industrial machine;

calculating, from the second time-dependent data, a third value of the operating characteristic over the time period;

receiving a fourth value of the operating characteristic detected at the oil and gas industrial machine;

determining a second anomaly score associated with a first portion of the second time-dependent data over the time period, the determination is based on the third value and the fourth value; and determining a modified anomaly score based on the first anomaly score and the second anomaly score.

2. The method of claim 1, wherein determining the first anomaly score includes calculating a difference between the first value of the operating characteristic and the second value of the operating characteristic and comparing the difference with a predetermined threshold value.

3. The method of claim 1 further comprising determining a first predictive model of the first sensor based on historical data associated with the first sensor.

4. The method of claim 3, wherein determining the first predictive model includes determining one or more coefficients of a characteristic equation associated with the oil and gas industrial machines based on the historical data, the characteristic equation configured to receive the first time-dependent data as an input and generate the first anomaly score.

5. The method of claim 3, wherein the first predictive model calculates the first value of the operating characteristic from the time-dependent data characterizing measurement by the first sensor.

6. The method of claim 1, wherein the graphical user interface display space includes a first interactive object and a second interactive object, the first interactive object configured to receive a first user input, and the second interactive object configured to receive a second user input.

7. The method of claim 6, wherein the determining of the first predictive model is performed based on the first user input.

8. The method of claim 6, wherein the receiving of time-dependent data characterizing measurement by a first sensor, the determining of the first anomaly score and the rendering of the visual representation are performed based on the second user input.

9. A system comprising:
at least one data processor;
memory coupled to the at least one data processor, the memory storing instructions to cause the at least one data processor to perform operations comprising:

receiving a first time-dependent data characterizing measurement by a first sensor operatively coupled to an oil and gas industrial machine;

calculating, from the first time-dependent data, a first value of an operating characteristic of the oil and gas industrial machine over a time period;

receiving a second value of the operating characteristic detected at the oil and gas industrial machine;

determining a first anomaly score associated with a first portion of the first time-dependent data over the time period, the determination is based on the first value and the second value ;

rendering, in a graphical user interface display space, a visual representation indicative of the first anomaly score;

receiving a second time-dependent data characterizing measurement by a second sensor operatively coupled to the oil and gas industrial machine;

calculating, from the second time-dependent data, a third value of the operating characteristic over the time period;

receiving a fourth value of the operating characteristic detected at the oil and gas industrial machine;

determining a second anomaly score associated with a first portion of the second time-dependent data over the time period, the determination is based on the third value and the fourth value; and determining a modified anomaly score based on the first anomaly score and the second anomaly score.

10. The system of claim 9, wherein determining the first anomaly score includes calculating a difference between the first value of the operating characteristic and the second value of the operating characteristic and comparing the difference with a predetermined threshold value.

11. The system of claim 9, wherein the operations further comprising determining a first predictive model of the first sensor based on historical data associated with the first sensor.

12. The system of claim 11, wherein determining the first predictive model includes determining one or more coefficients of a characteristic equation associated with the oil and gas industrial machines based on the historical data, the characteristic equation configured to receive the first time-dependent data as an input and generate the first anomaly score.

13. The system of claim 11, wherein the first predictive model calculates the first value of the operating characteristic from the time-dependent data characterizing measurement by the first sensor.

14. The system of claim 9, wherein the graphical user interface display space includes a first interactive object and a second interactive object, the first interactive object configured to receive a first user input, and the second interactive object configured to receive a second user input.

15. The system of claim 14, wherein the determining of the first predictive model is performed based on the first user input.

16. The system of claim 14, wherein the receiving of time-dependent data characterizing measurement by a first sensor, the determining of the first anomaly score and the rendering of the visual representation are performed based on the second user input.

* * * * *